US011234185B2

(12) United States Patent
Godin et al.

(10) Patent No.: US 11,234,185 B2
(45) Date of Patent: Jan. 25, 2022

(54) CELL IDENTIFIER FORMAT PER AREA IN WIRELESS NETWORK

(71) Applicant: Nokia Technologies Oy, Espoo (FI)

(72) Inventors: Philippe Godin, Versailles (FR); Guillaume Decarreau, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/650,497

(22) PCT Filed: Sep. 29, 2017

(86) PCT No.: PCT/FI2017/050689
§ 371 (c)(1),
(2) Date: Mar. 25, 2020

(87) PCT Pub. No.: WO2019/063870
PCT Pub. Date: Apr. 4, 2019

(65) Prior Publication Data
US 2020/0314737 A1    Oct. 1, 2020

(51) Int. Cl.
*H04W 48/16* (2009.01)
*H04W 48/08* (2009.01)

(52) U.S. Cl.
CPC ........... *H04W 48/16* (2013.01); *H04W 48/08* (2013.01)

(58) Field of Classification Search
CPC ............. H04W 24/02; H04W 36/0055; H04W 36/0061; H04W 36/0069; H04W 36/0083; H04W 36/0088; H04W 36/02; H04W 36/04; H04W 36/08; H04W 76/10; H04W 76/15; H04W 76/20; H04W 84/045; H04W 88/08; H04W 92/20; H04W 36/0011;
(Continued)

(56) References Cited

U.S. PATENT DOCUMENTS 10,045,266 B2 *   8/2018   Kang ................... H04W 36/04
10,608,927 B2 *   3/2020   Gandhi ................ H04W 24/02
(Continued)

FOREIGN PATENT DOCUMENTS

EP   2498541 A1   9/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.4.0, Sep. 2017, pp. 1-329.
(Continued)

*Primary Examiner* — Liton Miah
(74) *Attorney, Agent, or Firm* — Brake Hughes Bellermann LLP

(57) ABSTRACT

An apparatus including at least one processor and at least one memory including computer instructions that, when executed by the at least one processor, cause the apparatus to: receive, by a node within a wireless network, a cell identifier (e.g., GCI and/or NCI) for a cell and an area identifier associated with an area for the cell, wherein a format of the cell identifier, including a length of a base station identifier included within the cell identifier, is associated with the area identifier, determine a length of the base station identifier based on the area identifier, and determine the base station identifier based on the length of the base station identifier.

19 Claims, 11 Drawing Sheets

(58) Field of Classification Search
CPC ........... H04W 36/00835; H04W 36/36; H04W 80/02; H04W 8/08; H04W 8/26
See application file for complete search history.

(56) References Cited

U.S. PATENT DOCUMENTS

| | | | |
|---|---|---|---|
| 2005/0243772 A1 | 11/2005 | Lee et al. | |
| 2010/0105382 A1 | 4/2010 | Gallagher | |
| 2012/0257602 A1* | 10/2012 | Takahashi | H04W 36/0061 370/336 |
| 2014/0348008 A1* | 11/2014 | Li | H04W 4/90 370/252 |
| 2020/0322787 A1* | 10/2020 | Sivavakeesar | H04L 61/6063 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 14)", 3GPP TS 36.413, V14.3.0, Jun. 2017, pp. 1-347.

International Search Report and Written Opinion received for corresponding Patent Cooperation Treaty Application No. PCT/FI2017/050689, dated Jul. 9, 2018, 29 pages.

"Pseudo-CR on < CSG ID definition and Nested Addressing Structure", 3GPP TSG CT WG1 meeting #55, C1-083072, Agenda: SAEs, T-Mobile, Aug. 18-22, 2008, 9 pages.

\* cited by examiner

CELL IDENTIFIER FORMAT PER AREA IN WIRELESS NETWORK

RELATED APPLICATION

This application claims priority to PCT Application No. PCT/FI2017/050689, filed on Sep. 29, 2017, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes receiving, by a node within a wireless network, a cell identifier for a cell and an area identifier associated with an area for the cell, wherein a format of the cell identifier, including a length of a base station identifier included within the cell identifier, is associated with the area identifier; determining a length of the base station identifier based on the area identifier; and determining the base station identifier based on the length of the base station identifier.

According to an example implementation, an apparatus includes at least one processor and at least one memory including computer instructions, when executed by the at least one processor, cause the apparatus to: receive, by a node within a wireless network, a cell identifier for a cell and an area identifier associated with an area for the cell, wherein a format of the cell identifier, including a length of a base station identifier included within the cell identifier, is associated with the area identifier; determine a length of the base station identifier based on the area identifier; and determine the base station identifier based on the length of the base station identifier.

According to an example implementation, an apparatus includes means for receiving, by a node within a wireless network, a cell identifier for a cell and an area identifier associated with an area for the cell, wherein a format of the cell identifier, including a length of a base station identifier included within the cell identifier, is associated with the area identifier; means for determining a length of the base station identifier based on the area identifier; and means for determining the base station identifier based on the length of the base station identifier.

According to an example implementation, a computer program product includes a computer-readable storage medium and storing executable code that, when executed by at least one data processing apparatus, is configured to cause the at least one data processing apparatus to perform a method including: receiving, by a node within a wireless network, a cell identifier for a cell and an area identifier associated with an area for the cell, wherein a format of the cell identifier, including a length of a base station identifier included within the cell identifier, is associated with the area identifier; determining a length of the base station identifier based on the area identifier; and determining the base station identifier based on the length of the base station identifier.

According to an example implementation, a method includes receiving, by a source base station that is located in a first area of a wireless network, format information that identifies a cell identifier format for each of a plurality of other areas, each of the areas associated with an area identifier; receiving, by the source base station from a user device, a cell identifier for a discovered cell and an area identifier associated with an area for the discovered cell; determining, by the source base station, a format, of a plurality of different formats, of the cell identifier for the discovered cell based on the format information and the area identifier associated with the area for the discovered cell; and determining, by the source base station, a base station identifier of a target base station associated with the discovered cell, based on the cell identifier for the discovered cell and the format of the cell identifier for the discovered cell.

According to an example implementation, an apparatus includes at least one processor and at least one memory including computer instructions, when executed by the at least one processor, cause the apparatus to: receive, by a source base station that is located in a first area of a wireless network, format information that identifies a cell identifier format for each of a plurality of other areas, each of the areas associated with an area identifier; receive, by the source base station from a user device, a cell identifier for a discovered cell and an area identifier associated with an area for the discovered cell; determine, by the source base station, a format, of a plurality of different formats, of the cell identifier for the discovered cell based on the format information and the area identifier associated with the area for the discovered cell; and determine, by the source base station, a base station identifier of a target base station associated with the discovered cell, based on the cell identifier for the discovered cell and the format of the cell identifier for the discovered cell.

According to an example implementation, an apparatus includes means for receiving, by a source base station that is located in a first area of a wireless network, format information that identifies a cell identifier format for each of a plurality of other areas, each of the areas associated with an area identifier; means for receiving, by the source base station from a user device, a cell identifier for a discovered cell and an area identifier associated with an area for the discovered cell; means for determining, by the source base station, a format, of a plurality of different formats, of the cell identifier for the discovered cell based on the format information and the area identifier associated with the area for the discovered cell; and means for determining, by the source base station, a base station identifier of a target base station associated with the discovered cell, based on the cell identifier for the discovered cell and the format of the cell identifier for the discovered cell.

According to an example implementation, a computer program product includes a computer-readable storage medium and storing executable code that, when executed by at least one data processing apparatus, is configured to cause the at least one data processing apparatus to perform a method including: receiving, by a source base station that is located in a first area of a wireless network, format information that identifies a cell identifier format for each of a plurality of other areas, each of the areas associated with an area identifier; receiving, by the source base station from a user device, a cell identifier for a discovered cell and an area identifier associated with an area for the discovered cell; determining, by the source base station, a format, of a plurality of different formats, of the cell identifier for the discovered cell based on the format information and the area identifier associated with the area for the discovered cell; and determining, by the source base station, a base station identifier of a target base station associated with the discovered cell, based on the cell identifier for the discovered cell and the format of the cell identifier for the discovered cell.

According to an example implementation, a method includes establishing a connection between a user device and a source base station; receiving, by the user device from a discovered cell, a cell identifier associated with the discovered cell and an area identifier associated with an area for the discovered cell; and sending, by the user device to the source base station, the cell identifier and the area identifier associated with the discovered cell, wherein a format, of a plurality of different formats, of the cell identifier for the discovered cell is associated with the area identifier for the area of the discovered cell.

According to an example implementation, an apparatus includes at least one processor and at least one memory including computer instructions, when executed by the at least one processor, cause the apparatus to: establish a connection between a user device and a source base station; receive, by the user device from a discovered cell, a cell identifier associated with the discovered cell and an area identifier associated with an area for the discovered cell; and send, by the user device to the source base station, the cell identifier and the area identifier associated with the discovered cell, wherein a format, of a plurality of different formats, of the cell identifier for the discovered cell is associated with the area identifier for the area of the discovered cell.

According to an example implementation, an apparatus includes means for establishing a connection between a user device and a source base station; means for receiving, by the user device from a discovered cell, a cell identifier associated with the discovered cell and an area identifier associated with an area for the discovered cell; and means for sending, by the user device to the source base station, the cell identifier and the area identifier associated with the discovered cell, wherein a format, of a plurality of different formats, of the cell identifier for the discovered cell is associated with the area identifier for the area of the discovered cell.

According to an example implementation, a computer program product includes a computer-readable storage medium and storing executable code that, when executed by at least one data processing apparatus, is configured to cause the at least one data processing apparatus to perform a method including: establishing a connection between a user device and a source base station; receiving, by the user device from a discovered cell, a cell identifier associated with the discovered cell and an area identifier associated with an area for the discovered cell; and sending, by the user device to the source base station, the cell identifier and the area identifier associated with the discovered cell, wherein a format, of a plurality of different formats, of the cell identifier for the discovered cell is associated with the area identifier for the area of the discovered cell.

The details of one or more examples of implementations are set forth in the accompanying drawings and the description below. Other features will be apparent from the description and drawings, and from the claims.

DETAILED DESCRIPTION

Figure 1:
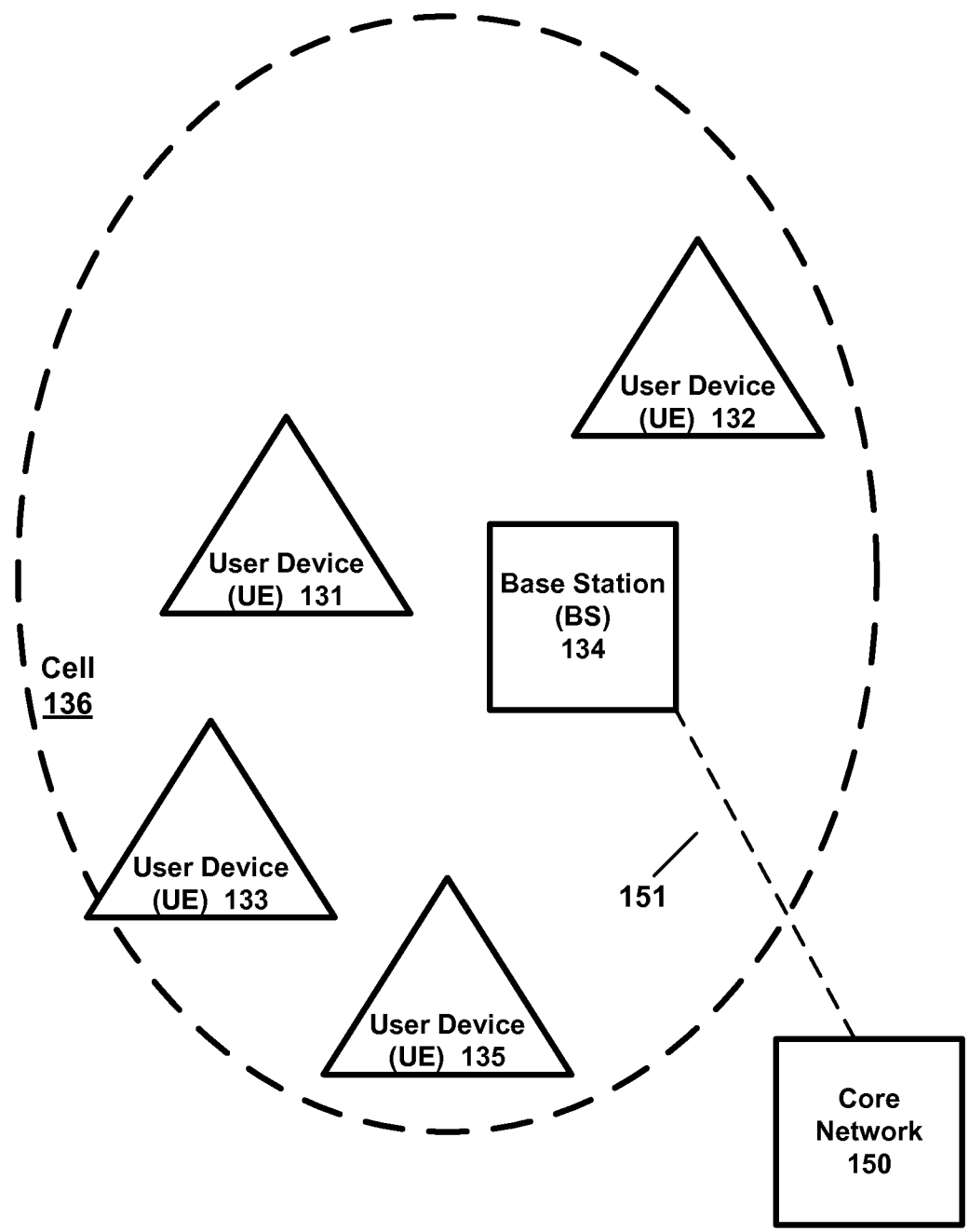
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB, or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (NR or 5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, NR/5G, cmWave, and/or mmWave band networks, IoT, MTC, eMTC, eMBB, URLLC, etc., or any other wireless network or wireless technology. These example networks, technologies or data service types are provided only as illustrative examples.

According to an example implementation, automatic neighbor relation (ANR) is a self-optimizing network (SON) function that may automate or assist BSs (e.g., eNBs) in the discovery and management of neighbor BSs. For example, after discovery of a neighbor (target) cell, a BS may add an entry for a cell to its neighbor relation table. A neighbor relation table, e.g., maintained by a BS for a source cell, may allow a BS (or source cell) to store information related to one or more neighbor (or target) cells, which may indicate, for example, a global cell identifier (GCI) for the target cell, an indication of whether or not a X2 interface (or connection) exists between the source cell and the target cell, whether a handover of a UE may be performed from the source cell to the target cell, and/or other information.

According to an example implementation, as part of ANR, a UE may send a report indicating a physical cell identifier (PCI) of one or more neighbor (or discovered) cells. The serving (or source) BS may reply to the UE with a request for a neighbor report from UE for the indicated PCI. The UE may receive (e.g., via system information block or SIB from the neighbor/target cell) a global cell identifier (GCI) for the target cell. The UE may then send a neighbor report to the serving/source BS, indicating the GCI of the target cell. The source (serving) BS may use the GCI of the target cell to communicate with the target BS associated with the target cell.

According to an example implementation, an example ANR process may include the following, by way of illustrative example:

1) UE reports physical cell identifier (PCI) of discovered cell to serving cell (to serving or source BS).

2) Serving/source BS requests a neighbor report from UE for the discovered cell (e.g., for the indicated PCI of the discovered cell).

3) UE receives broadcast control information (e.g., including system information block or SIB) from neighbor cell and reads/determines: a cell identifier, such as, for example, a Global Cell ID (GCI), or a network cell identifier (NCI), that identifies the target cell. GCI may, for example, correspond to or include, for example: a PLMN ID (public land mobile network identifier)+NCI (network cell identifier), where NCI may include a base station identifier (eNB/BS ID) that identifies target BS associated with target cell+local cell identifier (LCI) that identifies target cell provided by or associated with the target BS).

3) UE reports global cell ID (GCI) to serving (or source) cell.

4) Serving BS (in order to obtain Internet Protocol (IP) address of target BS corresponding to this discovered cell), determines BS ID, based on received GCI.

5) Serving BS now knows the BS ID for target BS associated with discovered cell. Serving BS sends target BS ID to core network node (or other node) to obtain the IP address of this target BS.

6) Core network (CN) node routes the request to target BS ID.

7) Target BS replies to CN node with its IP address and includes source BS ID as a destination for this reply.

8) CN node routes this reply to the source (serving) BS.

9) Serving BS/source BS uses this received IP address to send a connection (e.g., Stream Control Transmission Protocol or SCTP) setup message to set up a connection with target BS (to set up a connection between source BS and target BS).

However, it may be desirable to provide a cell identifier, e.g., a global cell identifier (GCI) or network cell identifier (NCI), that may support radio access network (RAN) nodes (e.g., BSs or eNBs) of different sizes, e.g., with different number of cells for each BS. For example, one type of BS may include relatively few (or small number of cells), whereas other types of BSs may include a large number of cells. Thus, it may be desirable to provide a GCI and/or NCI that may have multiple formats, e.g., to accommodate different numbers of BSs and/or different numbers of cells for each BS.

Figure 2:
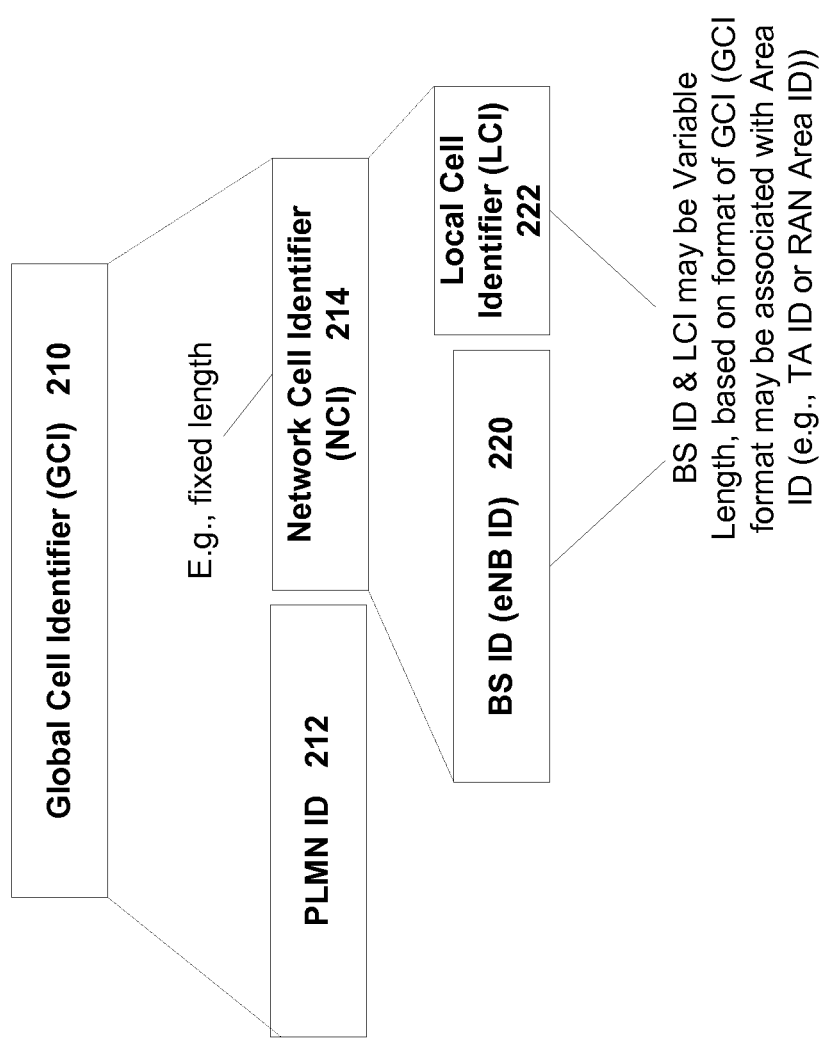
FIG. 2 is a diagram illustrating a format of a global cell identifier (GCI) according to an example implementation.

FIG. 2 is a diagram illustrating a format of a global cell identifier (GCI) according to an example implementation. Global cell identifier (GCI) 210 may include a public land mobile network (PLMN) identifier (PLMN ID) 212 to identify a PLMN for a cell, and a network cell identifier (NCI 214) to identify a cell within the indicated PLMN. For example, the NCI 214 may include a BS ID (also known as eNB ID or gNB ID) 220 to identify a BS (or eNB/gNB) that provides a cell or associated with a cell, and a local cell identifier (LCI) 222 that identifies a cell (of many cells) provided by the indicated BS.

According to an example implementation, in order to allow flexibility in terms of a number of BSs and/or a number of cells for a BS within a network/PLMN, the size or length of BS ID 220 and LCI 222 may vary (or may be variable). Thus, for example, while the NCI 214 may be a fixed (or static) length (e.g., 28 bits, for example, or other size), the number of the NCI bits allocated to each of the BS ID 220 and LCI 222 may not necessarily be static, but may change, e.g., based on a format of the GCI or NCI. However, a node may typically be unable to determine or detect a BS ID 220 within a received GCI 210 (or within NCI 214) if the node does not know which bits within the GCI 210 (or within NCI 214) are BS ID bits, and/or does not know the length (quantity of bits) for the BS ID 220 within the GCI 210 or NCI 214.

One option, for example, may be for each BS to send/transmit one or more bits to indicate the cell identifier format (e.g., either GCI format or NCI format (out of a plurality of possible formats) for a broadcast/transmitted GCI 210 and/or NCI 214. However, this approach may typically increase signaling overhead for the wireless (RAN) link between UE and BS, and thus, may typically decrease signaling efficiency.

Therefore, according to an example implementation, a format of a cell identifier (e.g., format of a GCI 210 or NCI 214) for a cell, including a length of a BS ID 220 and/or length of a LCI 222 within a cell identifier (GCI and/or NCI), is associated with an area or area identifier (area ID) for an area involving or including the cell. This example technique may allow use of different cell identifier (e.g., GCI 210 and/or NCI 214) formats (including different sizes/lengths for BS ID 220 and LCI 222), without requiring the transmission of additional signaling bits.

Thus, for example, there may be several possible cell identifier formats (and a corresponding allocation of bits between BS ID 220 and LCI 222, or indicating a length of the BS ID 220 and a length of the LCI 222, for each cell identifier (GCI and/or NCI) format, where there is a specific cell identifier format for (or assigned to) each area ID. For example, the NCI 214 may be a fixed length (e.g., 28 bits, 36 bits, or other length), and the cell identifier (e.g., GCI and/or NCI) format may indicate the allocation of NCI bits between BS ID 220 and LCI 222.

Each cell may have an area ID that identifies an area (e.g., a tracking area, a registration area, or a RAN area, or other area) for the cell or which covers or encompasses the cell. For example, if a node (UE or BS) determines or receives a cell identifier (e.g., GCI 210 and/or NCI 214) and an area ID for a cell, then the node may be able to (e.g., based on a table lookup based on the area ID) determine the cell identifier format (and thus a length of the BS ID 220 within such GCI 210 or NCI 214) for the cell, based on a mapping or association of area IDs and cell identifier formats (based on format information).

There may be different types of areas and area IDs that may be used for a cell. For example, an area for a cell may include a tracking area that may be identified by a tracking area identifier (TA ID), a registration area that may be identified by a registration area identifier (RA ID) or a radio access network (RAN) area identifier (RAN Area ID). Other areas may also be used or indicated for a cell.

According to an example implementation, a network (e.g., PLMN) may be partitioned into multiple Tracking areas (TAs), each TA is identified by a Tracking Area Identifier (TA ID). A Tracking Area (TA) (sometimes referred to as a paging area) may include an area that the UE will be paged within while in Idle mode when there is data for transmission to the UE. For example, a TA may include one or more cells. Also, for example, when a UE moves to a cell outside its current tracking area (or crosses a TA boundary that separates a current TA for the UE from a new TA), UE may send a tracking area update (or registration update/request) to the CN node, to update the TA for UE, so the network can page the UE. Each TA may have a different TA ID. Also, according to an example implementation, each TA (or each TA ID) may be associated with a cell identifier (e.g., GCI or NCI) format (e.g., indicating a BS ID length within a GCI 210 or NCI 214 to be used for each TA).

According to an example implementation, a registration area may include one or more tracking areas (TAs). Thus, for example, the CN may inform the UE that it may move within a specific RA (e.g., a Registration area that includes TA1, TA2, and TA3), and when UE moves outside this registration area (e.g., to TA4), the UE may send a TA Update to the CN (via the serving BS). Each Registration Area may be identified by a registration area ID, and each registration area ID may be associated with a specific cell identifier format (and thus associated with a specific length of BS ID 220 and length of LCI 222).

A RAN (radio access node) Area may include multiple cells. Each RAN Area may be identified by a RAN Area ID. Each RAN Area or RAN Area ID may be associated with a cell identifier (e.g., GCI or NCI) format (and thus, associated with a specific length of BS ID 220 and length of LCI 222).

Table 1 below indicates an example cell identifier (e.g., GCI 210 and/or NCI 214) format information for different Area identifiers (e.g., for different tracking area (TA) identifiers (TA IDs), different Registration Area Identifiers, or different RAN Area identifiers (RAN Area IDs), or other area IDs). According to the illustrative example shown in the Table 1, there may be multiple cell identifier (e.g., GCI and/or NCI) formats, e.g., including cell identifier formats F1, F2 and F3, for example. According to an example implementation, a total number of bits for a NCI 214 (included within a GCI 210) may be fixed (e.g., set to 28 bits, in this illustrative example), the allocation of these fixed number (e.g., 28) bits between BS ID 220 and LCI 222 may be different for different cell identifier formats, for example. Thus, different cell identifier (e.g., GCI 210 and/or NCI 214) formats may accommodate different numbers of BSs within a network and/or different numbers of cells for a BS. For example, a cell identifier format F1 may allocate 24 bits for a BS ID 220 and 4 bits to a LCI 222, e.g., to accommodate an area with a large number of BSs, and where each BS may include relatively few cells. On the other hand, a cell identifier format F3 may allocate only 16 bits for the BS ID 220 and 12 bits for LCI 222, within the GCI, e.g., in order to accommodate a situation where there are fewer BSs and/or wherein each BS may include a larger number of cells, for example. Similarly, a cell identifier format F2 may allocate 20 bits for the BS ID 220 and 8 bits for LCI 222, within the GCI. Thus, according to an example implementation, each of the different cell identifier formats (e.g., F1, F2, F3) may indicate or be associated with a different length or a different number of bits for the BS ID 220 and/or the LCI 222.

TABLE 1

Example cell identifier format information for different area identifiers (e.g., for different tracking area (TA) identifiers (TA IDs), Registration Area identifiers, or different RAN Area identifiers, or other area identifiers).

| Area ID For a Cell (e.g., Tracking Area ID, Reg. Area ID, or RAN Area ID) | Cell Identifier Format (e.g., GCI 210 and/or NCI 214 format) | BSID Length (#bits) | LCI Length (#bits) |
|---|---|---|---|
| Area-1 ID | F1 | 24 | 4 |
| Area-2 ID | F3 | 16 | 12 |
| Area-3 ID | F2 | 20 | 8 |
| Area-4 ID | F1 | 24 | 4 |
| Area-5 ID | F2 | 20 | 8 |

Each row of Table 1 identifies a cell identifier (e.g., GCI 210 and/or NCI 214) format (including identifying a corresponding length of BS ID 220 and length of LCI 222) that is associated with each of a plurality of Area IDs. Thus, the format information of Table 1 identifies a cell identifier format that has been assigned to (or associated with) each of a plurality of areas (or area IDs). The example format information shown in Table 1 indicates, by way of illustrative example, that Area-1 ID (e.g., identifying Area-1) is associated with cell identifier format F1 (e.g., indicating a BS ID length of 24 bits); Area-2 ID (e.g., identifying Area-2) is associated with cell identifier format F3 (e.g., indicating a BS ID length of 16 bits); Area-3 ID (e.g., identifying Area-3) is associated with cell identifier format F2 (e.g., indicating a BS ID length of 20 bits); Area-4 ID (e.g., identifying Area-4) is associated with cell identifier format F1; and, Area-5 ID (e.g., identifying Area-5) is associated with cell identifier format F2, etc. The Table 1 is merely an illustrative example of cell identifier format information, and other formats or examples may be used.

Figure 3:
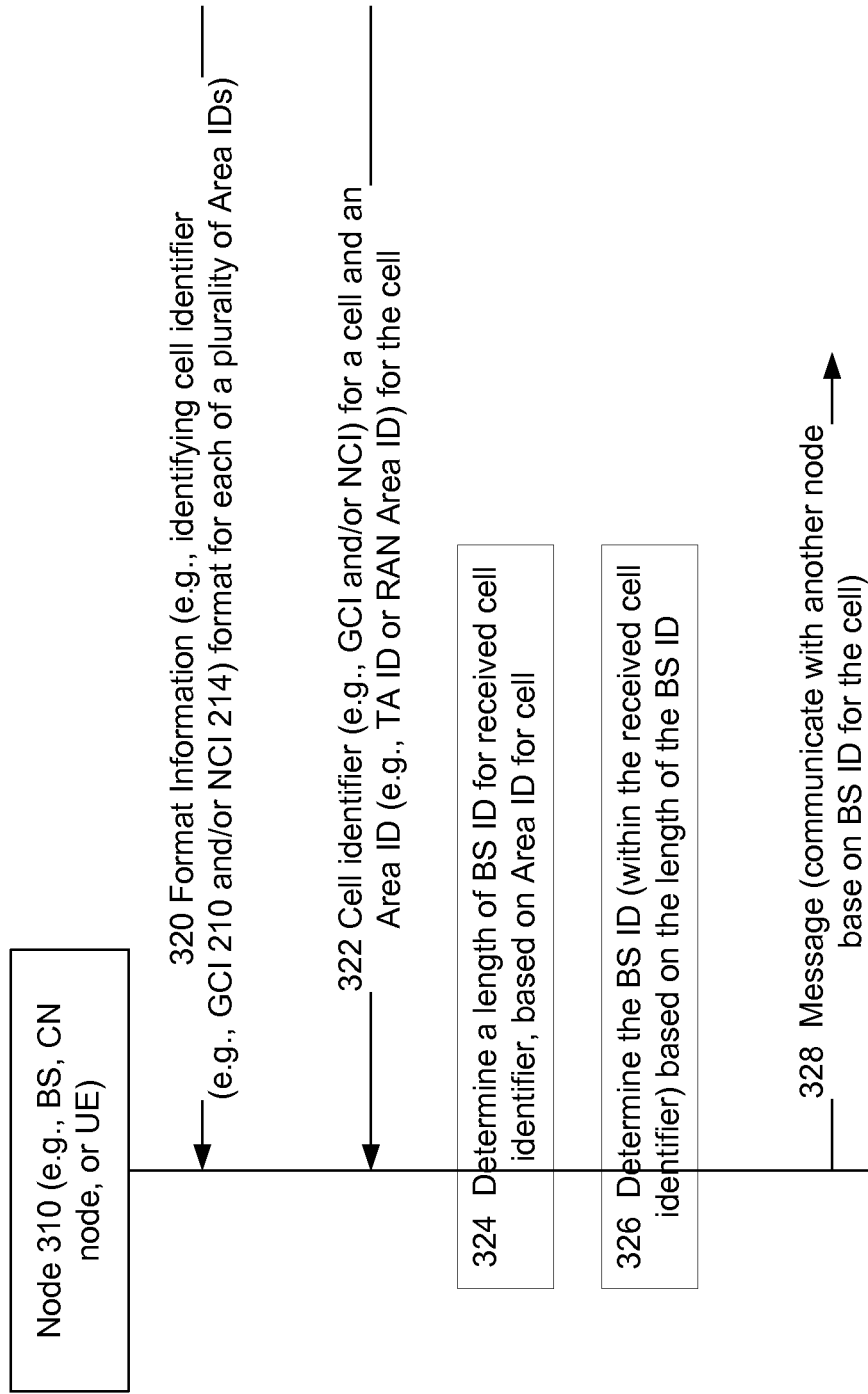
FIG. 3 is a diagram illustrating operation of a node according to an example implementation.

FIG. 3 is a diagram illustrating operation of a node according to an example implementation. As shown in FIG. 3, node 310 may be, for example, a base station (BS), a core network (CN) node, or a UE/user device, or other network node.

At 320, the node 310 receives format information (e.g., cell identifier format information) that identifies a cell identifier (e.g., GCI 210 and/or NCI 214) format for each of a plurality of areas, each of the areas associated with an area identifier (area ID) of a plurality of area identifiers, wherein each cell identifier format being associated with a length of a base station identifier (BS ID). For example, see Table 1 for an illustrative example of format information, or a portion thereof, that may be provided to the node 310 as format information.

At 322, the node 310 receives a cell identifier (e.g., a GCI 210 and/or a NCI 214) for a cell (e.g., for a discovered cell) and an area identifier (area ID) associated with an area for the cell, wherein a format of the cell identifier, including a length of a base station identifier (BS ID) included within the cell identifier, is associated with the area identifier (e.g., see Table 1 for illustrative examples).

At 324, the node 310 determines a length of the BS ID 220 based on the area ID. For example, the node 310 may perform a lookup, based on area ID for cell, into the format information (e.g., perform lookup into Table 1) to identify a corresponding cell format (e.g., F1, F2 or F3) and corresponding length of the BS ID 220 for the received cell identifier for the cell. For example, if the received area ID for the cell is Area-3 ID, then, based on the format information of Table 1, the associated cell identifier format for the cell is format F2, which corresponds to a BS ID length of 20 bits and a LCI length of 8 bits, according to an illustrative example implementation.

At 326, the node 310 may determine (e.g., receive and/or detect and/or decode) the base station ID based on the length of the base station ID. For example, if the BS ID length was determined (e.g., based on a cell identifier format of F2 that is associated with the area ID for the cell) as 20 bits, then the first 20 bits of the NCI 214 may be determined (e.g., received or detected, and decoded) as the BS ID 220, according to an illustrative example implementation. Thus, for example, a length of a BS ID may indicate which bits of the NCI 214 are provided as a BS ID 220 (e.g., and a remaining number of bits of the NCI 214 are provided as the LCI 222).

At 328, the node 310 may send a message or communicate with one or more other nodes based on the BS ID for the cell. For example, the node 310 may send an address request to a base station (BS) identified by the BS ID 220 for the cell (e.g., send a message to the target BS associated with the cell, which is identified by the BS ID 220 of the received cell identifier (GCI 210 and/or NCI 214).

With respect to FIG. 3, the area associated with the area ID for the discovered cell may include at least one of the following: a tracking area for the discovered cell that is associated with a tracking area identifier; a registration area for the discovered cell that is associated with a registration area identifier; and a radio access network (RAN) area for the discovered cell that is associated with a radio access network (RAN) area identifier.

Referring to FIG. 3, the receiving format information may include at least one of the following: receiving, by the node 310 from a core network node, format information that identifies a cell identifier (e.g., GCI 210 and/or NCI 214) format for each of a plurality of areas; and receiving, by the node 310 from a radio access network (RAN) operations and management (O&M) node, format information that identifies a cell identifier format for each of a plurality of areas.

Figure 4:
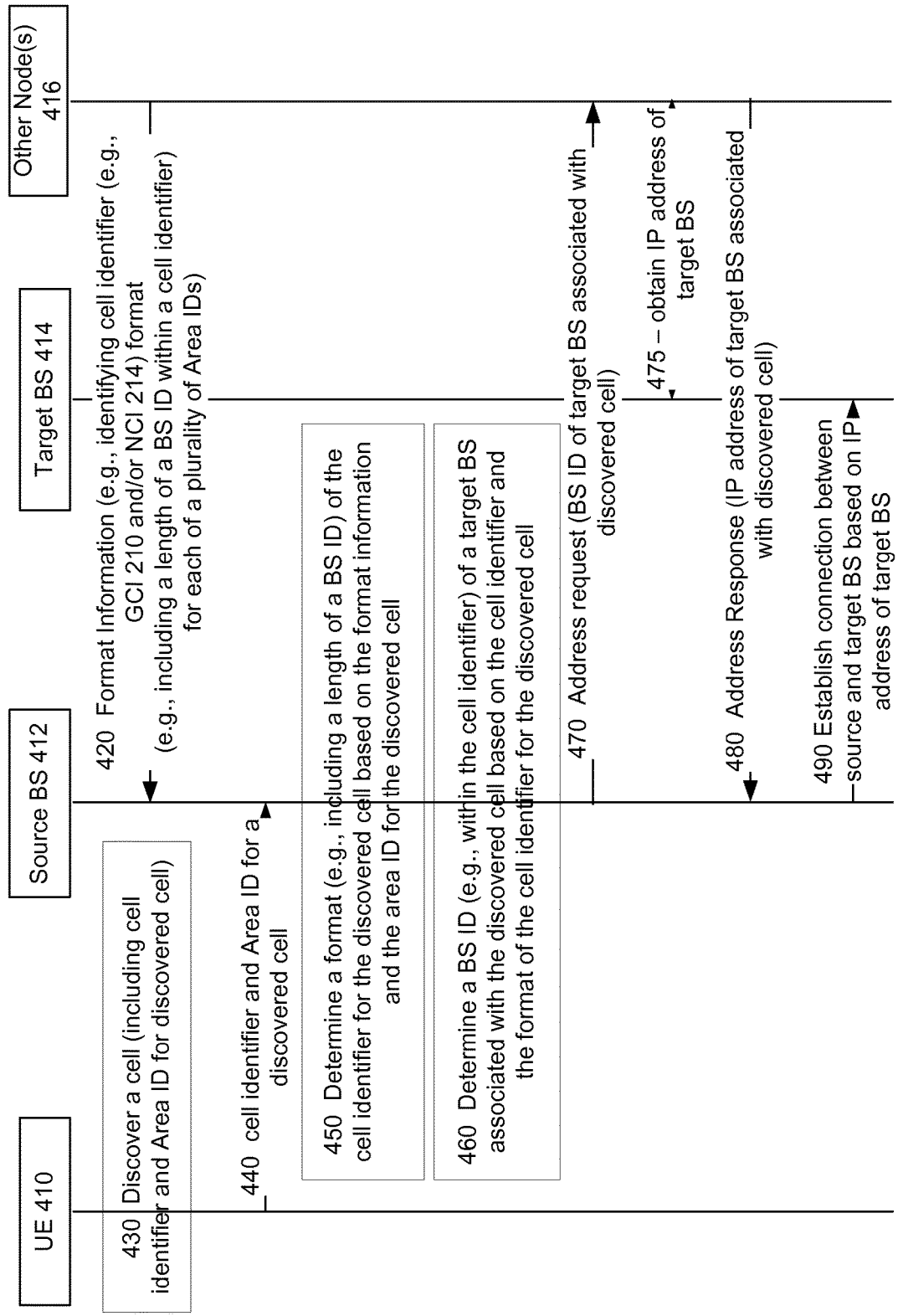
FIG. 4 is a diagram illustrating operation of a system according to an example implementation.

FIG. 4 is a diagram illustrating operation of a system according to an example implementation. As shown in FIG. 4, a UE 410, a source BS 412, a target BS 414 may be in communication, and possibly in communication with one or more other nodes (e.g., such as a core network node, and/or a RAN operations and management (RAN O&M) node).

At 420, the source BS 412, which may be serving UE 410 (and may be located in a first area) receives format information that identifies a cell identifier (e.g., GCI 210 and/or NCI 214) format for each of a plurality of other areas (e.g., at least for one or more neighbor areas that are neighbor or nearby the first area). Each of the areas may be associated with an area identifier (area ID).

At 430, UE 410 may discover a cell, e.g., by receiving system information (e.g., via system information block/SIB broadcast by the cell), including determining or receiving the cell identifier (e.g., GCI 210 and/or NCI 214) and an area ID for the discovered cell.

At 440, the UE 410 sends (e.g., via a neighbor report) the cell identifier (e.g., GCI 210 and/or NCI 214) and area ID for the discovered cell to the source BS 412. Thus, at 440, the source BS may receive from UE 412 the cell identifier for the discovered cell and the area ID associated with an area for the discovered cell.

At 450, the source BS may determine a format (e.g., GCI format and/or NCI format), of a plurality of different formats, of the cell identifier for the discovered cell based on the format information and the area ID associated with the area for the discovered cell. For example, see Table 1 (or portion thereof) as an illustrative example of the cell identifier (e.g., GCI 210 and/or NCI 214) format information. The source BS may perform a lookup into Table 1, based on the area ID for the discovered cell, to determine the cell identifier (e.g., GCI 210 and/or NCI 214) format for the discovered cell and area ID.

At 460, the source BS may determine a BS ID 220 of the target BS 414 associated with the discovered cell, based on the cell identifier for the discovered cell and the format of the cell identifier for the discovered cell. For example, determining the format of the cell identifier (e.g., format of the GCI 210 and/or NCI 214) at 450 provides or indicates a length of the BS ID 220 (and hence the location and number of bits of the BS ID 220). Thus, based on this cell identifier format (including length or number of bits for the BS ID 220), the source BS 412 may determine (e.g., received and/or detect) the BS ID 220 that is provided within the received cell identifier (e.g., GCI 210 and/or NCI 214) of the discovered cell.

At 470, the source BS may send to a network node (e.g., CN node or RAN O&M node) 416, an address request for the target base station, the address request indicating the base station identifier (BS ID 220) for the target BS 414. At 480, the source BS may receive an address (e.g., IP address) for the target BS 414. And, at 490, the source BS may send (e.g., based on the address of the target BS) to the target BS 414, a message to establish a connection between the source BS 412 and the target BS 414.

According to an example implementation, the area associated with the area ID for the discovered cell may include at least one of the following: a tracking area for the discovered cell that is associated with a tracking area identifier; a registration area for the discovered cell that is associated with a registration area identifier; and a radio access network (RAN) area for the discovered cell that is associated with a radio access network (RAN) area identifier.

According to an example implementation, the receiving format information at 420 may include at least one of the following: receiving, by the source base station from a core network node, format information that identifies a cell identifier format for each of a plurality of areas; and receiving, by the source base station from a radio access network (RAN) operations and management (O&M) node, format information that identifies a cell identifier format for each of a plurality of areas.

According to an example implementation, various alternative example implementations may be provided, including, for example, one or more of the following:

Alternative 1: When a RAN node (e.g., BS) reports the tracking areas (TAs), e.g., by reported a track area ID (TA ID) for each supported tracking area, which it supports to the core network (CN) node (e.g., as a RAN configuration), the RAN node/BS indicates the GCI format corresponding to or associated with each of these TA IDs, and the CN node may store this mapping or association between TA IDs and cell identifier (e.g., GCI and/or NCI) formats (e.g., such as Table 1, or portion thereof, as an illustrative example). Whenever a UE sends (to the CN node) a registration update (or tracking area update, e.g., to indicate the UE is now in a new tracking area) towards the CN node, the CN node may reply to the UE (e.g., via a serving BS) to indicate a cell identifier (e.g., GCI 210 and/or NCI 214) format of the new tracking area for the UE, or to indicate a cell identifier format for each tracking area within a registration area (that may include the new TA where the UE is now located) that may have been indicated by the UE to the CN. In this manner, the UE may receive the cell identifier format that is associated with each TA. Thus, in TA1, the UE may use (e.g., for receiving or determining a BS ID within a received cell identifier (e.g., GCI 210 and/or NCI 214) while in TA1) the cell identifier format 1 associated with TA1, and then after moving to TA2, the UE may then use cell identifier format 2 (e.g., for receiving or determining a BS ID within a received cell identifier while in TA2) associated with TA2, for example. For example, whenever the UE reads the broadcast cell identifier (e.g., a broadcast GCI 210 and/or NCI 214) of a BS2 cell upon a request from BS1, the UE may read or receive both the cell identifier of BS2 and the TA ID of BS2, and then the UE can determine (based on the received cell identifier format indication for BS2) BS2 ID, thanks to the format information received as part of the tracking area update performed by the UE to the CN, and then the UE can report/send BS2 ID of the cell identifier for the discovered cell of BS2 to BS1 as requested by BS1.

Alternative 2: (e.g., where the cell identifier format information, such as Table 1, is stored in the CN node, such as in AMF of CN). For example, the CN node (e.g., AMF node, Access and Mobility Function) distributes to all BSs of a given tracking area/TA ID, the cell identifier format associated with each of one or more neighbor tracking areas (for one or more neighbor TAs). Whenever a UE served by BS1 reports the cell identifier (e.g., GCI 210 and/or NCI 214) of a discovered cell associated with BS2 together with TA ID of the BS2 cell, the BS1 can determine the cell identifier format (and length of BS ID of a received GCI) to read and decode cell identifier of the discovered cell of BS2 based on the received TA of discovered cell of BS2, and therefore, BS1 can determine BS2 ID. BS1 can further trigger the TNL (transport network layer address) discovery process (e.g., see 470, 475 and 480 of FIG. 4) including sending the BS2 ID to a CN node and obtain the IP address of BS2.

Alternative 3A The RAN O&M node, which may provide operations and management function for the radio access network (RAN), distributes to all BSs of a given tracking area (TA) the cell identifier (e.g., GCI 210 and/or NCI 214) format associated with or corresponding to one or more neighboring TAs. Whenever a UE served by BS1 reports the cell identifier of a discovered cell associated with BS2 together with TA ID of the BS2 cell, the BS1 can determine the cell identifier format (and length of BS ID of a received cell identifier) to read and decode cell identifier of the discovered cell of BS2 based on the received TA of discovered cell of BS2, and therefore, BS1 can determine BS2 ID. BS1 can further trigger the TNL (transport network layer address) discovery process (e.g., see 470, 475 and 480 of FIG. 4) including sending the BS2 ID to a CN node (or RAN O&M node) and obtain the IP address of BS2.

Alternative 3B: The RAN O&M node, which may provide operations and management function for the radio access network (RAN), distributes to all BSs of a given or RAN area the cell identifier (e.g., GCI 210 and/or NCI 214) format associated with or corresponding to one or more neighboring RAN Areas. This alternative 3B is same as 3A, except, the cell identifier information is provided and determined per radio access node (RAN) area ID, instead of per TA ID. A cell identifier format is associated with an Area (e.g., a RAN Area); A RAN Area—for 5G—a Tracking Area may be partitioned into multiple RAN areas (e.g., this may be a static partition). A RAN Area may, for example, include multiple, e.g., 10-100 cells, and a TA may include 100-1000 cells (or 10-100 RAN Areas), by way of illustrative example, although these are merely examples and other numbers may be used.

Alternative 4 (e.g., where the cell identifier (e.g., GCI 210 and/or NCI 214) format information, such as Table 1, may be stored in a CN node, such as in AMF of CN). Whenever a UE served by BS1 reports the cell identifier of a discovered cell of BS2 together with TA of BS2, this may trigger the TNL discovery process including the cell identifier format and TA of BS2 cell. When the CN node (e.g., AMF) receives the TNL discovery message, it can determine from the TA ID of BS2 cell how to read and determine (e.g., decode) the cell identifier of BS2 cell and determine the BS2 ID associated with of BS2 cell. The AMF/CN node further routes the message towards the BS2 ID, and the BS2 returns its IP address which is forwarded by CN node back to the BS1.

According to an example implementation, an advantage of this technique may include, at least in some cases, avoiding transmitting format information element (or the cell identifier format information) over the wireless radio interface which has scarce or very limited resources in particular for the broadcast. In alternative 1, the format IE (cell identifier format information) may be instead determined by the UE through piggy-backing in existing dedicated signaling for registration update/tracking area update which can include a few more bits without creating significant problems. In other alternatives, the format IE or cell identifier format information may be instead determined or obtained by the source (serving) BS/eNB based on two inputs: input 1 the pre-configuration of the table (e.g., cell identifier format per TA/RA ID or RAN Area ID) for neighboring TAs/RAs or RAN Areas, and input 2 may include the TA/RA ID or RAN Area ID reported by the UE for discovered cell after UE has read the SIB (including cell identifier (e.g., GCI 210 and/or NCI 214) and TA/RA ID or RAN Area ID) of the discovered/neighbor cell.

Figure 5:
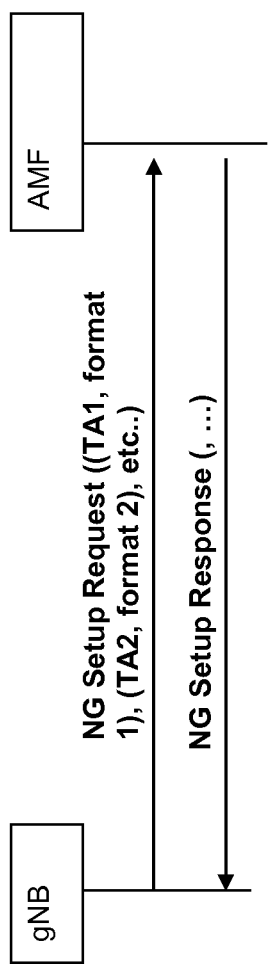
FIG. 5 is a diagram illustrating a signal exchange between a BS (gNB) and a core network node (AMF) according to an example implementation.
Figure 6:
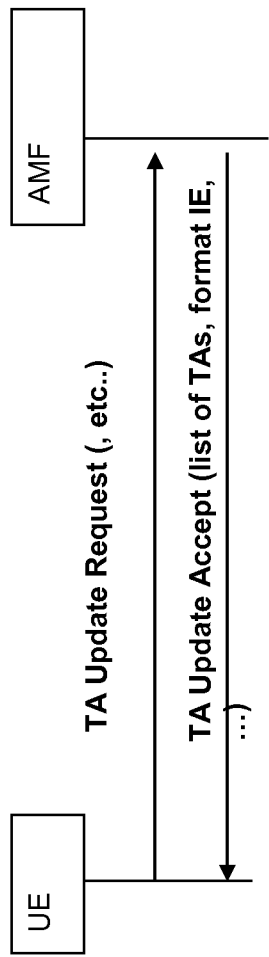
FIG. 6 is a diagram illustrating a signal exchange between a UE and a core network node (AMF) according to an example implementation.

FIG. 5 is a diagram illustrating a signal exchange between a BS (gNB) and a core network node (AMF) according to an example implementation. As shown in FIG. 5, a NG setup request is sent from the BS/gNB node to the CN node (AMF), The setup request includes a TA ID and associated GCI format are provided for each of a plurality tracking areas (e.g., TA1, TA2). A setup response is then returned by the CN node/AMF to the BS/gNB FIG. 6 is a diagram illustrating a signal exchange between a UE and a core network node (AMF) according to an example implementation. As shown in FIG. 6, the UE may send TA update request to the CN node/AMF, and the AMF/CN node may reply with a list of TAs and associated GCI format for the list (e.g., for a plurality of listed TA IDs). In this manner, the CN node may inform the UE of a cell identifier (e.g., GCI 210 and/or NCI 214) format for one or more (e.g., neighbor) tracking areas/TA IDs.

Figure 7:
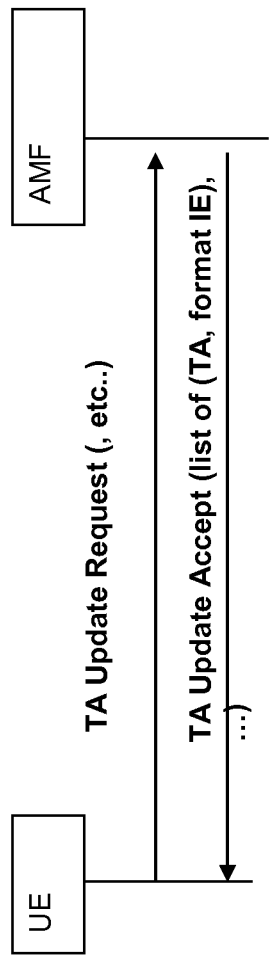
FIG. 7 is a diagram illustrating a signal exchange between a UE and a core network node (AMF) according to an example implementation.

FIG. 7 is a diagram illustrating a signal exchange between a UE and a core network node (AMF) according to an example implementation. In this example, this is similar to FIG. 6, but the CN node replies with a TA ID and an associated cell identifier (e.g., GCI 210 and/or NCI 214) format for each of a plurality of tracking areas. Thus, the UE may determine an associated cell identifier format for each of a plurality of indicates TAs/TA IDs.

Figure 8:
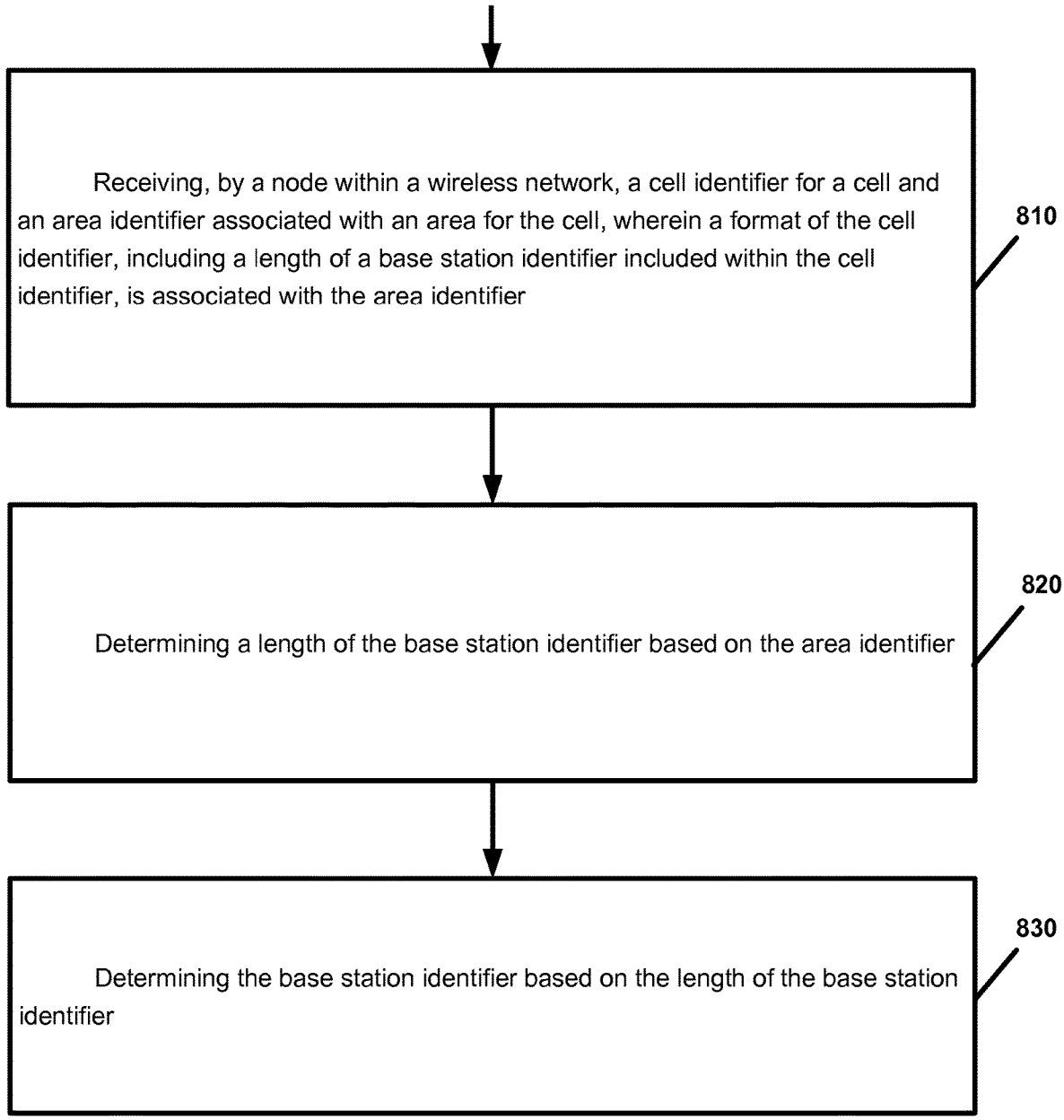
FIG. 8 is a flow chart illustrating operation of a node according to an example implementation.

Example 1: FIG. 8 is a flow chart illustrating operation of a node according to an example implementation. Operation 810 includes receiving, by a node within a wireless network, a cell identifier for a cell and an area identifier associated with an area for the cell, wherein a format of the cell identifier, including a length of a base station identifier included within the cell identifier, is associated with the area identifier. Operation 820 includes determining a length of the base station identifier based on the area identifier. And, operation 830 includes determining the base station identifier based on the length of the base station identifier. For example, a cell identifier may include a global cell identifier (GCI) 210 and/or a network cell identifier (NCI) 214, by way of illustrative example. Also, for example, a cell identifier may include a base station identifier (BS ID 220) and/or a local cell identifier (LCI) 222 therein.

Example 2: According to an example implementation of example 1, wherein the node comprises at least one of the following: a base station; a core network node; and a user device.

Example 3: According to an example implementation of any of examples 1-2, and further comprising: communicating with another node based on the base station identifier for the cell.

Example 4: According to an example implementation of any of examples 1-3, and further comprising: communicating with a base station based on the base station identifier for the cell.

Example 5: According to an example implementation of any of examples 1-4, and further comprising: sending, by the node, an address request to another node to request an address of the base station identified by the base station identifier.

Example 6: According to an example implementation of any of examples 1-5, wherein the area identifier associated with the area for the discovered cell comprises at least one of the following: a tracking area for the discovered cell that is associated with a tracking area identifier; and a radio access network (RAN) area for the discovered cell that is associated with a radio access network (RAN) area identifier.

Example 7: According to an example implementation of any of examples 1-6, and further comprising: receiving format information that identifies a cell identifier format for each of a plurality of areas, each of the areas associated with an area identifier of a plurality of area identifiers, wherein each cell identifier format being associated with a length of a base station identifier.

Example 8: According to an example implementation of any of examples 1-7, wherein the receiving format information comprises at least one of the following: receiving, by the node from a core network node, format information that identifies a cell identifier format for each of a plurality of areas; and receiving, by the node from a radio access network (RAN) operations and management (O&M) node, format information that identifies a cell identifier format for each of a plurality of areas.

Example 9: An apparatus comprising at least one processor and at least one memory including computer instructions that, when executed by the at least one processor, cause the apparatus to: receive, by a node within a wireless network, a cell identifier for a cell and an area identifier associated with an area for the cell, wherein a format of the cell identifier, including a length of a base station identifier included within the cell identifier, is associated with the area identifier; determine a length of the base station identifier based on the area identifier; and determine the base station identifier based on the length of the base station identifier.

Example 10: According to an example implementation of example 9, wherein the node comprises at least one of the following: a base station; a core network node; and a user device.

Example 11: According to an example implementation of any of examples 9-10, and further causing the apparatus to: communicate with a base station based on the base station identifier for the cell.

Example 12: According to an example implementation of any of examples 9-11, and further causing the apparatus to: send, by the node, an address request to a base station identified by the base station identifier.

Example 13: According to an example implementation of any of examples 9-12, wherein the area identifier associated with the area for the discovered cell comprises at least one of the following: a tracking area for the discovered cell that is associated with a tracking area identifier; and a radio access network (RAN) area for the discovered cell that is associated with a radio access network (RAN) area identifier.

Example 14: According to an example implementation of any of examples 9-13, and further causing the apparatus to: receive format information that identifies a cell identifier format for each of a plurality of areas, each of the areas associated with an area identifier of a plurality of area identifiers, wherein each cell identifier format being associated with a length of a base station identifier.

Example 15: According to an example implementation of example 14, wherein causing the apparatus to receive format information comprises causing the apparatus to: receive, by the node from a core network node, format information that identifies a cell identifier format for each of a plurality of areas; and receive, by the node from a radio access network (RAN) operations and management (O&M) node, format information that identifies a cell identifier format for each of a plurality of areas.

Figure 9:
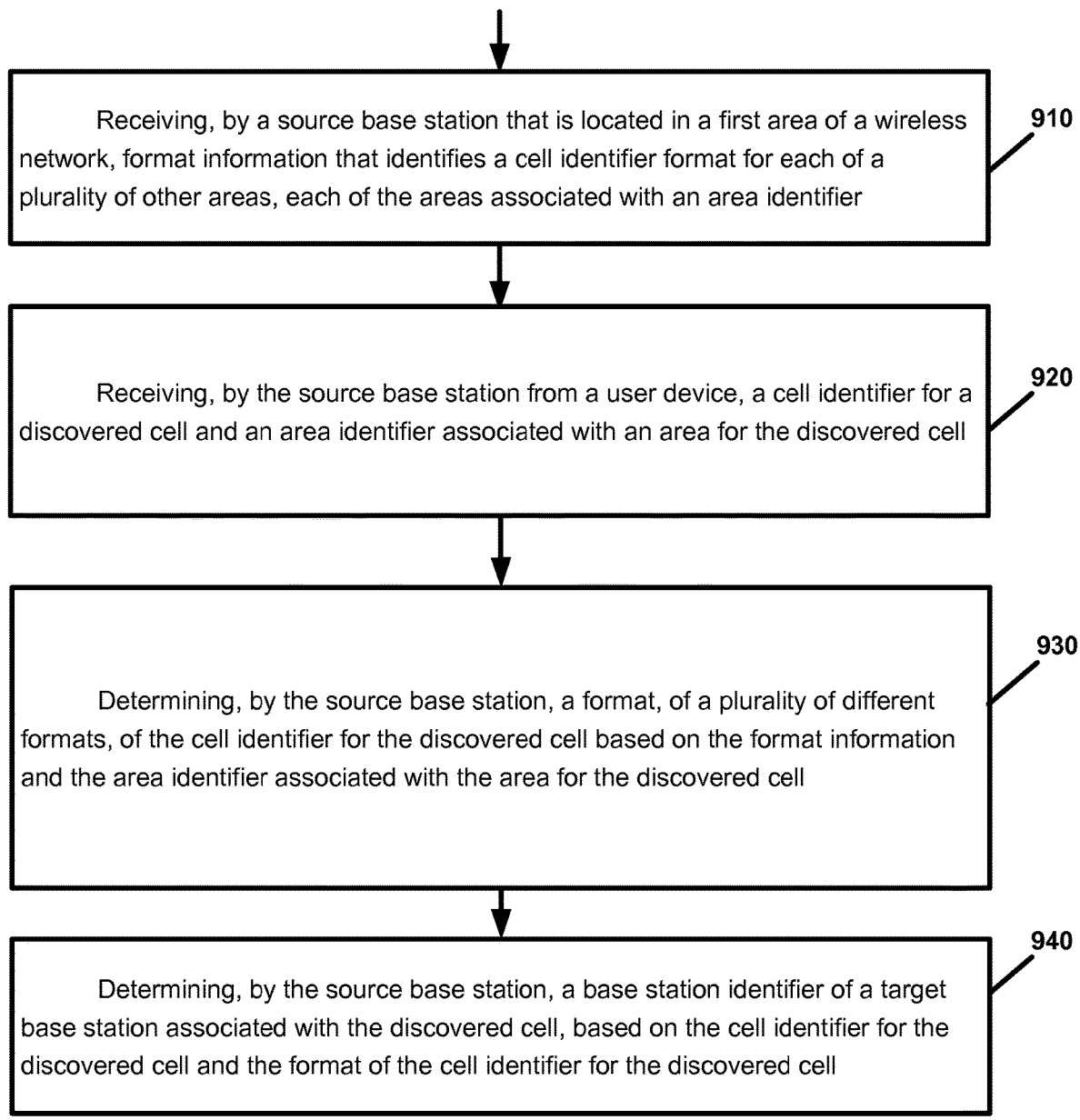
FIG. 9 is a flow chart illustrating operation of a base station according to an example implementation.

Example 16: FIG. 9 is a flow chart illustrating operation of a base station according to an example implementation. Operation 910 may include receiving, by a source base station that is located in a first area of a wireless network, format information that identifies a cell identifier format for each of a plurality of other areas, each of the areas associated with an area identifier. Operation 920 may include receiving, by the source base station from a user device, a cell identifier for a discovered cell and an area identifier associated with an area for the discovered cell. Operation 930 includes determining, by the source base station, a format, of a plurality of different formats, of the cell identifier for the discovered cell based on the format information and the area identifier associated with the area for the discovered cell. Operation 940 includes determining, by the source base station, a base station identifier of a target base station associated with the discovered cell, based on the cell identifier for the discovered cell and the format of the cell identifier for the discovered cell.

Example 17: According to an example implementation of example 16, and further comprising communicating, by the source base station with the target base station, based on the base station identifier for the target cell.

Example 18: According to an example implementation of any of examples 16-17, wherein the cell identifier format for each of a plurality of other areas comprises: a cell identifier format for each of a plurality of neighbor areas that are a neighbor to the first area.

Example 19: According to an example implementation of any of examples 16-18, wherein the area identifier associated with the area for the discovered cell comprises at least one of the following: a tracking area for the discovered cell that is associated with a tracking area identifier; and a radio access network (RAN) area for the discovered cell that is associated with a radio access network (RAN) area identifier.

Example 20: According to an example implementation of any of examples 16-19, wherein the cell identifier for the discovered cell comprises the base station identifier of the target base station, wherein a length of the base station identifier for the target base station is based on the format of the cell identifier for the discovered cell.

Example 21: According to an example implementation of any of examples 16-20, wherein each cell identifier comprises a base station identifier, wherein a cell identifier format is associated with one of a plurality of area identifiers and indicates a length, of a plurality of different lengths, of a base station identifier of a cell identifier.

Example 22: According to an example implementation of any of examples 16-21, wherein the receiving format information comprises at least one of the following: receiving, by the source base station from a core network node, format information that identifies a cell identifier format for each of a plurality of areas; and receiving, by the source base station from a radio access network (RAN) operations and management (O&M) node, format information that identifies a cell identifier format for each of a plurality of areas.

Example 23: According to an example implementation of any of examples 16-22, wherein the communicating comprises: sending, by the source base station to a network node, an address request for the target base station, the address request indicating the base station identifier for the target base station; receiving, by the source base station, an address for the target base station; and sending, by the source base station to the target base station, a message to establish a connection between the source base station and the target base station.

Example 24: According to an example implementation, an apparatus comprising at least one processor and at least one memory including computer instructions that, when executed by the at least one processor, cause the apparatus to: receive, by a source base station that is located in a first area of a wireless network, format information that identifies a cell identifier format for each of a plurality of other areas, each of the areas associated with an area identifier; receive, by the source base station from a user device, a cell identifier for a discovered cell and an area identifier associated with an area for the discovered cell; determine, by the source base station, a format, of a plurality of different formats, of the cell identifier for the discovered cell based on the format information and the area identifier associated with the area for the discovered cell; and determine, by the source base station, a base station identifier of a target base station associated with the discovered cell, based on the cell identifier for the discovered cell and the format of the cell identifier for the discovered cell.

Figure 10:
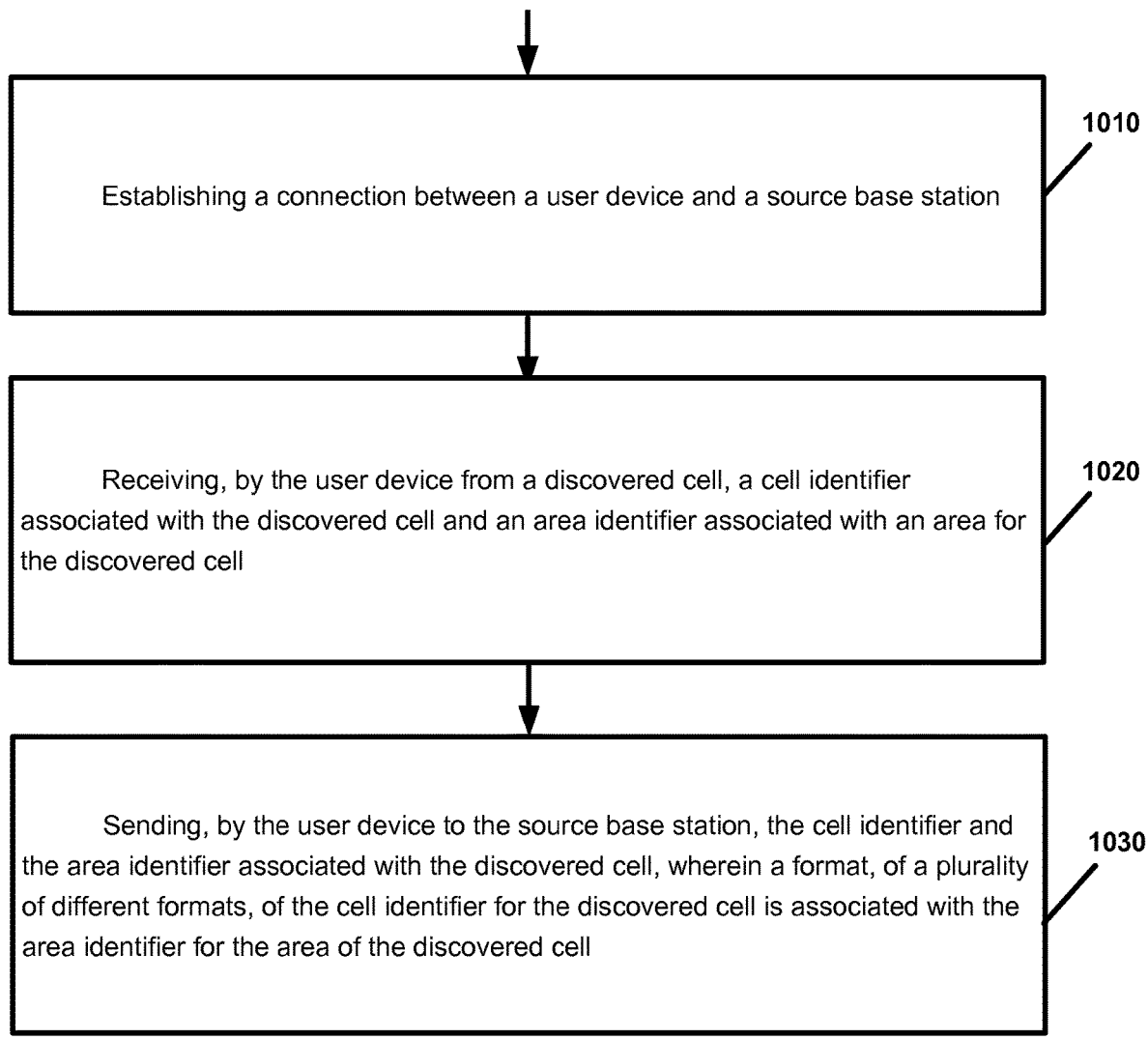
FIG. 10 is a flow chart illustrating operation of a user device according to an example implementation.

Example 25: FIG. 10 is a flow chart illustrating operation of a user device according to an example implementation.

Operation 1010 includes establishing a connection between a user device and a source base station. Operation 1020 includes receiving, by the user device from a discovered cell, a cell identifier associated with the discovered cell and an area identifier associated with an area for the discovered cell. And, operation 1030 includes sending, by the user device to the source base station, the cell identifier and the area identifier associated with the discovered cell, wherein a format, of a plurality of different formats, of the cell identifier for the discovered cell is associated with the area identifier for the area of the discovered cell.

Example 26: According to an example implementation of example 25, wherein the area identifier associated with the area for the discovered cell comprises at least one of the following: a tracking area for the discovered cell that is associated with a tracking area identifier; and a radio access network (RAN) area for the discovered cell that is associated with a radio access network (RAN) area identifier.

Example 27: According to an example implementation of any of examples 25-26, wherein the cell identifier for the discovered cell comprises a base station identifier of a target base station, wherein a length of the base station identifier for the target base station is based on the format of the cell identifier for the discovered cell.

Example 28: An apparatus comprising at least one processor and at least one memory including computer instructions that, when executed by the at least one processor, cause the apparatus to: establish a connection between a user device and a source base station; receive, by the user device from a discovered cell, a cell identifier associated with the discovered cell and an area identifier associated with an area for the discovered cell; and send, by the user device to the source base station, the cell identifier and the area identifier associated with the discovered cell, wherein a format, of a plurality of different formats, of the cell identifier for the discovered cell is associated with the area identifier for the area of the discovered cell.

Example 29: According to an example implementation of example 28, wherein the area identifier associated with the area for the discovered cell comprises at least one of the following: a tracking area for the discovered cell that is associated with a tracking area identifier; and a radio access network (RAN) area for the discovered cell that is associated with a radio access network (RAN) area identifier.

Example 30: According to an example implementation of any of examples 28-29, wherein the cell identifier includes a base station identifier, and wherein the format of the cell identifier indicates a size, of a plurality of different sizes, of the base station identifier.

Example 31: An apparatus comprising means for performing a method of any of examples 1-8, 16-23 and 25-27.

Example 32: An apparatus comprising at least one processor and at least one memory including computer instructions that, when executed by the at least one processor, cause the apparatus to perform a method of any of examples 1-8, 16-23 and 25-27.

Example 33: An apparatus comprising a computer program product including a non-transitory computer-readable storage medium and storing executable code that, when executed by at least one data processing apparatus, is configured to cause the at least one data processing apparatus to perform a method of any of examples 1-8, 16-23 and 25-27.

Figure 11:
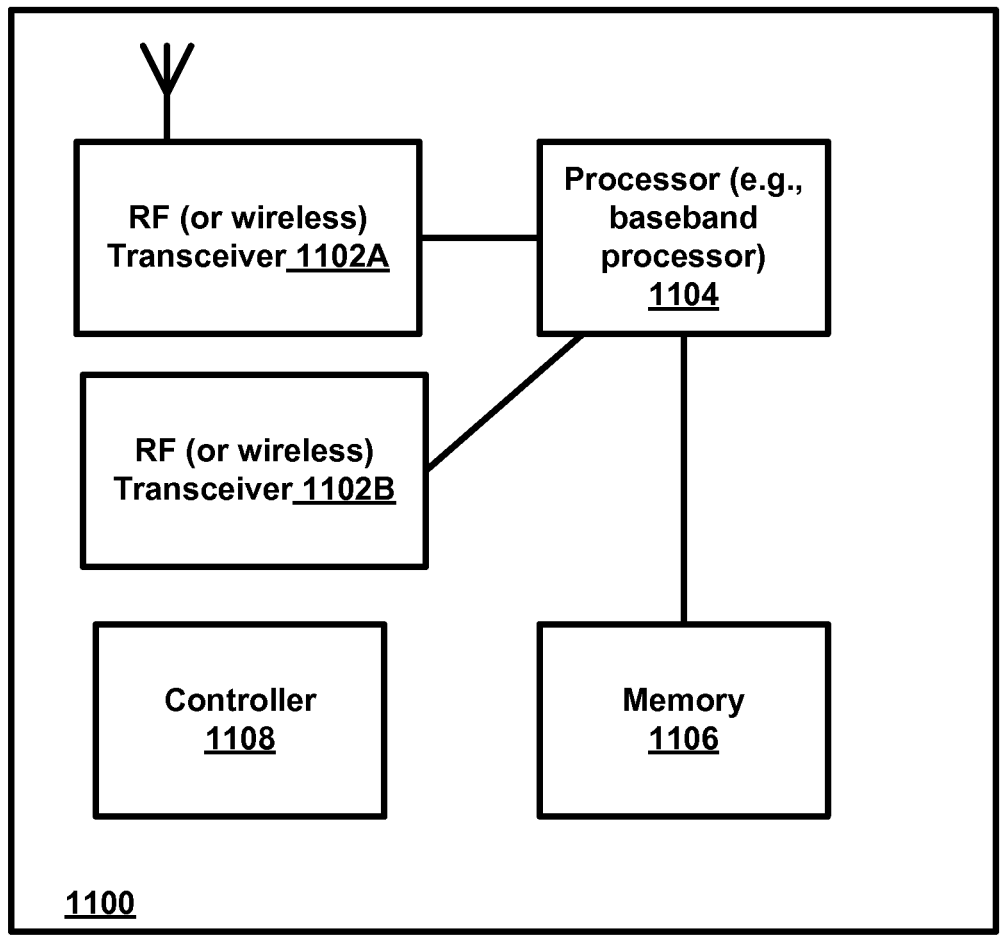
FIG. 11 is a block diagram of a node or wireless station (e.g., base station/access point or mobile station/user device) according to an example implementation.

FIG. 11 is a block diagram of a wireless station (e.g., AP, BS, relay node, eNB, UE or user device) 1100 according to an example implementation. The wireless station 1100 may include, for example, one or more RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11 a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a source base station that is located in a first area of a wireless network, format information that identifies a cell identifier format for each of a plurality of other areas, each of the areas associated with an area identifier;
   receiving, by the source base station from a user device, a cell identifier for a discovered cell and an area identifier associated with an area for the discovered cell;
   determining, by the source base station, a format, of a plurality of different formats, of the cell identifier for the discovered cell based on the format information and the area identifier associated with the area for the discovered cell; and
   determining, by the source base station, a base station identifier of a target base station associated with the discovered cell, based on the cell identifier for the discovered cell and the format of the cell identifier for the discovered cell.

2. The method of claim 1, further comprising:
   communicating, by the source base station with the target base station, based on the base station identifier for the target cell.

3. The method of claim 1, wherein each of the plurality of neighbor areas is a neighbor to the first area.

4. The method of claim 1, wherein the area for the discovered cell comprises at least one of the following:
   a tracking area for the discovered cell that is associated with a tracking area identifier; and
   a radio access network (RAN) area for the discovered cell that is associated with a radio access network (RAN) area identifier.

5. The method of claim 1, wherein the cell identifier for the discovered cell comprises the base station identifier of the target base station, wherein a length of the base station identifier for the target base station is based on the format of the cell identifier for the discovered cell.

6. The method of claim 1, wherein the cell identifier comprises a base station identifier, wherein a cell identifier format is associated with one of a plurality of area identifiers and indicates a length, of a plurality of different lengths, of a base station identifier of a cell identifier.

7. The method of claim 1, wherein the receiving format information comprises at least one of the following:
   receiving, by the source base station from a core network node, format information that identifies a cell identifier format for each of a plurality of areas; and
   receiving, by the source base station from a radio access network (RAN) operations and management (O&M) node, format information that identifies a cell identifier format for each of a plurality of areas.

8. The method of claim 1, wherein the communicating comprises:
   sending, by the source base station to a network node, an address request for the target base station, the address request indicating the base station identifier for the target base station;
   receiving, by the source base station, an address for the target base station; and
   sending, by the source base station to the target base station, a message to establish a connection between the source base station and the target base station.

9. An apparatus comprising:
   at least one processor and at least one memory comprising computer program code, the at least one memory and computer program code configured, with the at least one processor, to cause the apparatus at least to:
   receive, by a source base station that is located in a first area of a wireless network, format information that identifies a cell identifier format for each of a plurality of other areas, each of the areas associated with an area identifier;
   receive, by the source base station from a user device, a cell identifier for a discovered cell and an area identifier associated with an area for the discovered cell;
   determine, by the source base station, a format, of a plurality of different formats, of the cell identifier for the discovered cell based on the format information and the area identifier associated with the area for the discovered cell; and
   determine, by the source base station, a base station identifier of a target base station associated with the discovered cell, based on the cell identifier for the discovered cell and the format of the cell identifier for the discovered cell.

10. The apparatus of claim 9, wherein the at least one memory and computer program code configured, with the at least one processor, to cause the apparatus further to:
    communicate, by the source base station with the target base station, based on the base station identifier for the target cell.

11. The apparatus of claim 9, wherein each of the plurality of neighbor areas is a neighbor to the first area.

12. The apparatus of claim 9, wherein the area for the discovered cell comprises at least one of the following:
    a tracking area for the discovered cell that is associated with a tracking area identifier; and
    a radio access network (RAN) area for the discovered cell that is associated with a radio access network (RAN) area identifier.

13. The apparatus of claim 9, wherein the cell identifier for the discovered cell comprises the base station identifier of the target base station, wherein a length of the base station identifier for the target base station is based on the format of the cell identifier for the discovered cell.

14. The apparatus of claim 9, wherein the cell identifier comprises a base station identifier, wherein a cell identifier format is associated with one of a plurality of area identifiers and indicates a length, of a plurality of different lengths, of a base station identifier of a cell identifier.

15. The apparatus of claim 9, wherein when receiving format information, the at least one memory and computer program code configured, with the at least one processor, to cause the apparatus to:
    receive, by the source base station from a core network node, format information that identifies a cell identifier format for each of a plurality of areas; or/and
    receive, by the source base station from a radio access network (RAN) operations and management (O&M) node, format information that identifies a cell identifier format for each of a plurality of areas.

16. The apparatus of claim 9, wherein when communicating, the at least one memory and computer program code configured, with the at least one processor, to cause the apparatus to:
    send, by the source base station to a network node, an address request for the target base station, the address request indicating the base station identifier for the target base station;
    receive, by the source base station, an address for the target base station; and send, by the source base station to the target base station, a message to establish a connection between the source base station and the target base station.

17. A method comprising:

establishing a connection between a user device and a source base station;

receiving, by the user device from a discovered cell, a cell identifier associated with the discovered cell and an area identifier associated with an area for the discovered cell; and sending, by the user device to the source base station, the cell identifier and the area identifier associated with the discovered cell, wherein a format of the cell identifier for the discovered cell is associated with the area identifier for the area of the discovered cell, and wherein the format of the cell identifier is determinable based on the area identifier;

wherein the cell identifier for the discovered cell comprises a base station identifier of a target base station, wherein a length of the base station identifier for the target base station is based on the format of the cell identifier for the discovered cell.

18. The method of claim 17, wherein the area for the discovered cell comprises at least one of the following:

a tracking area for the discovered cell that is associated with a tracking area identifier; and a radio access network (RAN) area for the discovered cell that is associated with a radio access network (RAN) area identifier.

19. The method of claim 17, wherein the cell identifier comprises a base station identifier, wherein a cell identifier format is associated with one of a plurality of area identifiers and indicates a length, of a plurality of different lengths, of a base station identifier of a cell identifier.

* * * * *